United States Patent
Cho et al.

(10) Patent No.: US 9,906,774 B2
(45) Date of Patent: Feb. 27, 2018

(54) METHOD AND APPARATUS FOR OBTAINING 3D IMAGE

(71) Applicant: LG ELECTRONICS INC., Seoul (KR)

(72) Inventors: Ayoung Cho, Seoul (KR); Sunho Yang, Seoul (KR); Yunsup Shin, Seoul (KR); Sungmin Kim, Seoul (KR); Youngman Kwon, Seoul (KR); Yungwoo Jung, Seoul (KR); Seongkeun Ahn, Seoul (KR); Changhwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 332 days.

(21) Appl. No.: 14/647,003

(22) PCT Filed: Aug. 13, 2013

(86) PCT No.: PCT/KR2013/007292
§ 371 (c)(1),
(2) Date: May 22, 2015

(87) PCT Pub. No.: WO2014/081107
PCT Pub. Date: May 30, 2014

(65) Prior Publication Data
US 2015/0304638 A1 Oct. 22, 2015

Related U.S. Application Data

(60) Provisional application No. 61/729,417, filed on Nov. 23, 2012.

(30) Foreign Application Priority Data

Jul. 30, 2013 (KR) .................. 10-2013-0090156

(51) Int. Cl.
*H04N 13/02* (2006.01)
*G01B 11/25* (2006.01)
(Continued)

(52) U.S. Cl.
CPC ..... *H04N 13/0257* (2013.01); *G01B 11/2513* (2013.01); *G01S 17/89* (2013.01);
(Continued)

(58) Field of Classification Search
CPC .. H04N 5/33; H04N 5/222; H04N 7/18; H04N 13/0296
See application file for complete search history.

(56) References Cited

U.S. PATENT DOCUMENTS

2002/0139920 A1 10/2002 Seibel et al.
2007/0146539 A1* 6/2007 Kawahara ......... H01L 27/14818
348/370
(Continued)

FOREIGN PATENT DOCUMENTS

CN 1575524 A 2/2005
CN 101621697 A 1/2010
(Continued)

*Primary Examiner* — Sath V Perungavoor
*Assistant Examiner* — Patricia I Young
(74) *Attorney, Agent, or Firm* — Birch, Stewart, Kolasch & Birch, LLP

(57) ABSTRACT

An apparatus for obtaining a 3D image including a light transmitter configured to transmit infrared ray (IR) structured light to a recognized object; an RGB-IR sensor configured to receive infrared rays and visible light reflected from the recognized object; a processor configured to obtain 3D image information including depth information and a visible light image of the recognized object by using each of the infrared rays and the visible light, which are received by the RGB-IR sensor. The processor is further configured to obtain infrared differential images by subtracting infrared (Continued)

images obtained for a visible light measurement time period T1 from infrared images obtained for an infrared measurement time period T2.

13 Claims, 8 Drawing Sheets

(51) Int. Cl.

| | | |
|---|---|---|
| *G01S 17/89* | (2006.01) | |
| *H04N 9/04* | (2006.01) | |
| *H04N 5/33* | (2006.01) | |
| *H04N 5/376* | (2011.01) | |
| *H04N 5/235* | (2006.01) | |
| *G06T 7/50* | (2017.01) | |
| *H04N 13/00* | (2018.01) | |

(52) U.S. Cl.
CPC ............. *G06T 7/50* (2017.01); *H04N 5/2351* (2013.01); *H04N 5/2352* (2013.01); *H04N 5/33* (2013.01); *H04N 5/3765* (2013.01); *H04N 9/045* (2013.01); *H04N 13/0029* (2013.01); *H04N 13/0037* (2013.01); *H04N 13/0207* (2013.01); *H04N 13/0253* (2013.01); *H04N 13/0296* (2013.01); *H04N 2013/0081* (2013.01)

(56) References Cited

U.S. PATENT DOCUMENTS

| | | |
|---|---|---|
| 2008/0122933 A1 | 5/2008 | Murayama |
| 2009/0295906 A1 | 12/2009 | Kushimoto et al. |
| 2010/0128129 A1 | 5/2010 | Kim |
| 2010/0265316 A1 | 10/2010 | Sali et al. |
| 2011/0102547 A1 | 5/2011 | Sul et al. |
| 2011/0262032 A1 | 10/2011 | Gu |
| 2011/0317005 A1 | 12/2011 | Atkinson |
| 2012/0038904 A1 | 2/2012 | Fossum et al. |
| 2012/0056988 A1 | 3/2012 | Stanhill et al. |
| 2012/0092485 A1 | 4/2012 | Meinherz et al. |
| 2012/0169848 A1 | 7/2012 | Bae et al. |
| 2012/0249740 A1 | 10/2012 | Lee et al. |
| 2013/0120623 A1 | 5/2013 | Kim |
| 2014/0285672 A1 | 9/2014 | Högasten et al. |

FOREIGN PATENT DOCUMENTS

| | | |
|---|---|---|
| CN | 101635860 A | 1/2010 |
| CN | 102376728 A | 3/2012 |
| CN | 102461156 A | 5/2012 |
| CN | 102741781 A | 10/2012 |
| JP | 2008-8700 A | 1/2008 |
| KR | 10-2012-0075739 A | 7/2012 |
| KR | 10-2012-0110614 A | 10/2012 |
| WO | WO 2011/069148 A1 | 6/2011 |

\* cited by examiner

FIG. 4

| R | G | R | G | R | G | R | G | R | G | R | G |
|---|---|---|---|---|---|---|---|---|---|---|---|
| IR | B | IR | B | IR | B | IR | B | IR | B | IR | B |
| R | G | R | G | R | G | R | G | R | G | R | G |
| IR | B | IR | B | IR | B | IR | B | IR | B | IR | B |
| R | G | R | G | R | G | R | G | R | G | R | G |
| IR | B | IR | B | IR | B | IR | B | IR | B | IR | B |

| R | G | IR | G | R | G | (212) IR | G | R | G | IR | G |
|---|---|---|---|---|---|---|---|---|---|---|---|
| IR | B | R | B | (217) IR | (221) B | (222) R | (223) B | (213) IR | B | R | B |
| R | G | IR | G | R | (228) G | (211) IR | (224) G | R | G | IR | G |
| IR | B | R | B | (216) IR | (227) B | (226) R | (225) B | (214) IR | B | R | B |
| R | G | IR | G | R | G | (215) IR | G | R | G | IR | G |
| IR | B | R | B | IR | B | R | B | IR | B | R | B |

(a)

(b)

(c)

| C0 | C1 | C2 | C3 | C4 | C5 |
|----|----|----|----|----|----|
| I0 | I1 | I2 | I3 | I4 | I5 |

METHOD AND APPARATUS FOR OBTAINING 3D IMAGE

CROSS REFERENCE TO RELATED APPLICATIONS

This application is the National Phase of PCT International Application No. PCT/KR2013/007292, filed on Aug. 13, 2013, which claims priority under 35 U.S.C. 119(e) to U.S. Provisional Application No. 61/729,417, filed on Nov. 23, 2012 and under 35 U.S.C. 119(a) to Korean Application No. 10-2013-0090156, filed on Jul. 30, 2013, all of which are hereby expressly incorporated by reference into the present application.

TECHNICAL FIELD

The present invention relates to a method and apparatus for obtaining a 3D (3-dimension) image, and more particularly, to a method and apparatus for obtaining a 3D image by using infrared rays together with visible light.

BACKGROUND ART

Recently, various techniques and products for obtaining a 3D image from a recognized object have been developed. For example, a TOF (Time Of Flight) system is to obtain a 3D image from a distance or depth between a camera and a recognized object, which is measured using a temporal difference between a light emission time for irradiating light to the recognized object and a light receiving time of light reflected from the recognized object. Also, a structure light system is to obtain a 3D image from a depth of a recognized object, which is measured by emitting patterned infrared structured light to the recognized object and analyzing a pattern of infrared rays received from the recognized object.

In this regard, although two or more visible light images may be used to obtain 3D depth information, a system, which uses the visible light images together with infrared ray images as an active light source, has been used recently. Also, in this system, it is general that a separate sensor (RGB sensor) for taking visible light is provided together with an infrared ray sensor (IR sensor). Furthermore, a camera sensor structure for obtaining visible light images and infrared ray images from one RGB-IR sensor by modifying one of sensor pixels for taking visible light to a pixel for obtaining infrared rays has been studied.

SUMMARY

The RGB-IR single sensor has not been applied to an infrared structure light system for obtaining a 3D image, and there has been a difficulty in design of an integrated product as cases of related studies and developments have not been disclosed. Also, in the case that the RGB-IR sensor is used as a means for obtaining a 3D image, a problem occurs as follows. That is, if an infrared ray image and a visible light image are obtained from one sensor like the RGB-IR sensor, interference generally occurs between a visible light area and an infrared ray area.

Hereinafter, the above interference will be described in more detail. An infrared lighting should be activated continuously to obtain an infrared image. Also, the infrared lighting activated continuously affects a visible light image, and this is referred to as interference between the infrared rays and the visible light. If the interference occurs, noise occurs in the obtained visible light image and infrared image. As a result, a problem occurs in that an incorrect 3D image is obtained by the interference.

The present invention has been devised to solve the aforementioned problems, and an object of the present invention is to provide an apparatus and method for efficiently obtaining a 3D image by applying a single RGB-IR sensor to an infrared structured light system.

Another object of the present invention is to provide an apparatus and method for efficiently obtaining a 3D image by removing interference between a visible light area and an infrared area when an RGB-IR sensor is used. For example, as an embodiment of the present invention, it is intended to provide a method and apparatus for removing interference by separating a time period for taking visible light from a time period for taking infrared rays.

Still another object of the present invention is to provide an apparatus and method for efficiently obtaining a 3D image by using infrared differential images obtained from infrared images respectively obtained from the time period for taking visible light and the time period for taking infrared rays.

Further still another object of the present invention is to provide an apparatus and method for obtaining a 3D image by controlling an infrared ray emission period in accordance with brightness of ambient light. For example, as an embodiment of the present invention, it is intended to provide a method and apparatus for controlling a time for period taking a visible light area and an infrared area by adaptively responding to ambient light.

Further still another object of the present invention is to provide an apparatus for displaying a 3D image by using the aforementioned method for obtaining a 3D image by removing interference.

To achieve the aforementioned objects, according to one embodiment of the present invention, an apparatus for obtaining a 3D image comprises a light transmitting unit for emitting infrared ray (IR) structured light to a recognized object; a light receiving unit comprising an RGB-IR sensor for receiving infrared rays and visible light reflected from the recognized object; a processor for obtaining 3D image information including depth information and a visible light image of the recognized object by using each of the infrared rays and the visible light, which are received by the light receiving unit; and a lighting unit for controlling a lighting cycle of the infrared ray (IR) structured light. Also, the apparatus further comprises an image recovery unit for recovering a 3D image of the recognized object by using the 3D image information which is obtained by the processor; and a display unit for providing the recovered 3D image on a visual screen.

Also, the lighting unit controls the lighting cycle of the infrared ray (IR) structured light to remove interference between a visible light measurement time period T1 and an infrared measurement time period T2 by separating the visible light measurement time period T1 and the infrared measurement time period T2 from each other.

Also, the lighting unit controls the lighting cycle of the infrared ray (IR) structured light to repeat the visible light measurement time period T1 and the infrared measurement time period T2 at the same period by considering brightness of ambient light when brightness of the ambient light is more than a predetermined conventional reference value Th2.

Also, the processor obtains infrared differential images by subtracting infrared images obtained for the visible light measurement time period T1 from infrared images obtained for the infrared measurement time period T2.

Also, the processor measures a depth of the recognized object by using the obtained infrared differential images.

Also, the lighting unit controls the lighting cycle of the infrared ray (IR) structured light to allow the visible light measurement time period T1 to be longer than the infrared measurement time period T2 if brightness of the ambient light is less than the predetermined conventional reference value Th2.

Also, the lighting unit controls the lighting cycle of the infrared ray (IR) structured light to allow the infrared measurement time period T2 only without the visible light measurement time period T1 if brightness of the ambient light is less than a predetermined minimum reference value Th1.

Also, the RGB-IR sensor comprising the light receiving unit determines arrangement of R, G, B and IR pixels so that the IR pixels are not arranged at equivalent intervals.

A method for obtaining a 3D image in accordance with one embodiment of the present invention comprises the steps of emitting infrared ray (IR) structured light to a recognized object and receiving infrared rays and visible light reflected from the recognized object; and obtaining 3D image information including depth information and a visible light image of the recognized object by using each of the infrared rays and the visible light, which are received, wherein a lighting cycle of the infrared ray (IR) structured light is controlled to remove interference between a visible light measurement time period T1 and an infrared measurement time period T2 by separating the visible light measurement time period T1 and the infrared measurement time period T2 from each other when the infrared ray (IR) structured light is emitted to the recognized object.

Also, the lighting cycle of the infrared ray (IR) structured light is controlled to allow the infrared measurement time period T2 only without the visible light measurement time period T1 if brightness of the ambient light is less than a predetermined minimum reference value Th1.

Also, the lighting cycle of the infrared ray (IR) structured light is controlled to allow the visible light measurement time period T1 to be longer than the infrared measurement time period T2 if brightness of the ambient light is between the minimum reference value Th1 and a conventional reference value Th2.

Also, the lighting cycle of the infrared ray (IR) structured light is controlled to repeat the visible light measurement time period T1 and the infrared measurement time period T2 at the same period if brightness of the ambient light is more than the conventional reference value Th2.

Also, the method further comprises the step of obtaining infrared differential images by subtracting infrared images obtained for the visible light measurement time period T1 from infrared images obtained for the infrared measurement time period T2.

Also, a depth of the recognized object is measured by using the obtained infrared differential images.

According to another embodiment of the present invention, a method for obtaining a 3D image by emitting infrared ray (IR) structured light to a recognized object and obtaining 3D image information of the recognized object by using infrared rays and visible light reflected from the recognized object comprises the steps of measuring ambient light; comparing the measured ambient light with a predetermined reference value; controlling a lighting cycle of the infrared ray (IR) structured light to remove interference between a visible light measurement time period T1 and an infrared measurement time period T2 by separating the visible light measurement time period T1 and the infrared measurement time period T2 from each other.

The other objects, features and advantages of the present invention will be apparent through the detailed description of the embodiments described with reference to the accompanying drawings.

Advantageous Effects

According to the present invention, interference of an RGB-IR sensor used to obtain a 3D image may be removed. Also, as the interference is removed, clearer and accurate 3D images may be obtained.

Also, interference of the RGB-IR sensor may be removed by adaptively responding to brightness of ambient visible light. Therefore, more accurate 3D images may be obtained regardless of time or place for taking images, such as night, day, a dark space, or a bright space.

Furthermore, clearer and accurate 3D image signals may be displayed through an apparatus for obtaining a 3D image in accordance with the present invention.

BRIEF DESCRIPTION OF THE DRAWINGS

FIG. 4 is an exemplary diagram illustrating a pixel arrangement order of an RGB-IR sensor according to the related art;

FIG. 5 is an exemplary diagram illustrating a pixel arrangement order of an RGB-IR sensor according to the embodiment of the present invention;

DETAILED DESCRIPTION OF EMBODIMENTS OF THE INVENTION

Hereinafter, the preferred embodiments of the present invention through which the aforementioned objects may be carried out in detail will be described with reference to the accompanying drawings.

Although the terms used in the present invention are selected from generally known and used terms considering their functions in the present invention, it will be apparent that the terms may be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein. In more detail, although the terms such as "first" and/or "second" in the present invention may be used to describe various elements, it is to be understood that the elements are not limited by such terms. Also, the terms may be used to identify one element from another element. For example, a first element may be referred to as a second element or vice versa within the range that does not depart from the scope according to a concept of the present specification.

Also, specific structural or functional descriptions of the embodiments according to the concept of the present invention, which are disclosed in this specification, are exemplarily intended to describe the embodiments according to the concept of the present invention. Various modifications may be made in the embodiments according to the concept of the present invention, and the embodiments are therefore to be construed in all aspects as illustrative and not restrictive. Therefore, it is to be understood that the disclosure in this specification includes all modifications, equivalents or replacements included in the spirits and technical range of the present invention.

Figure 1:
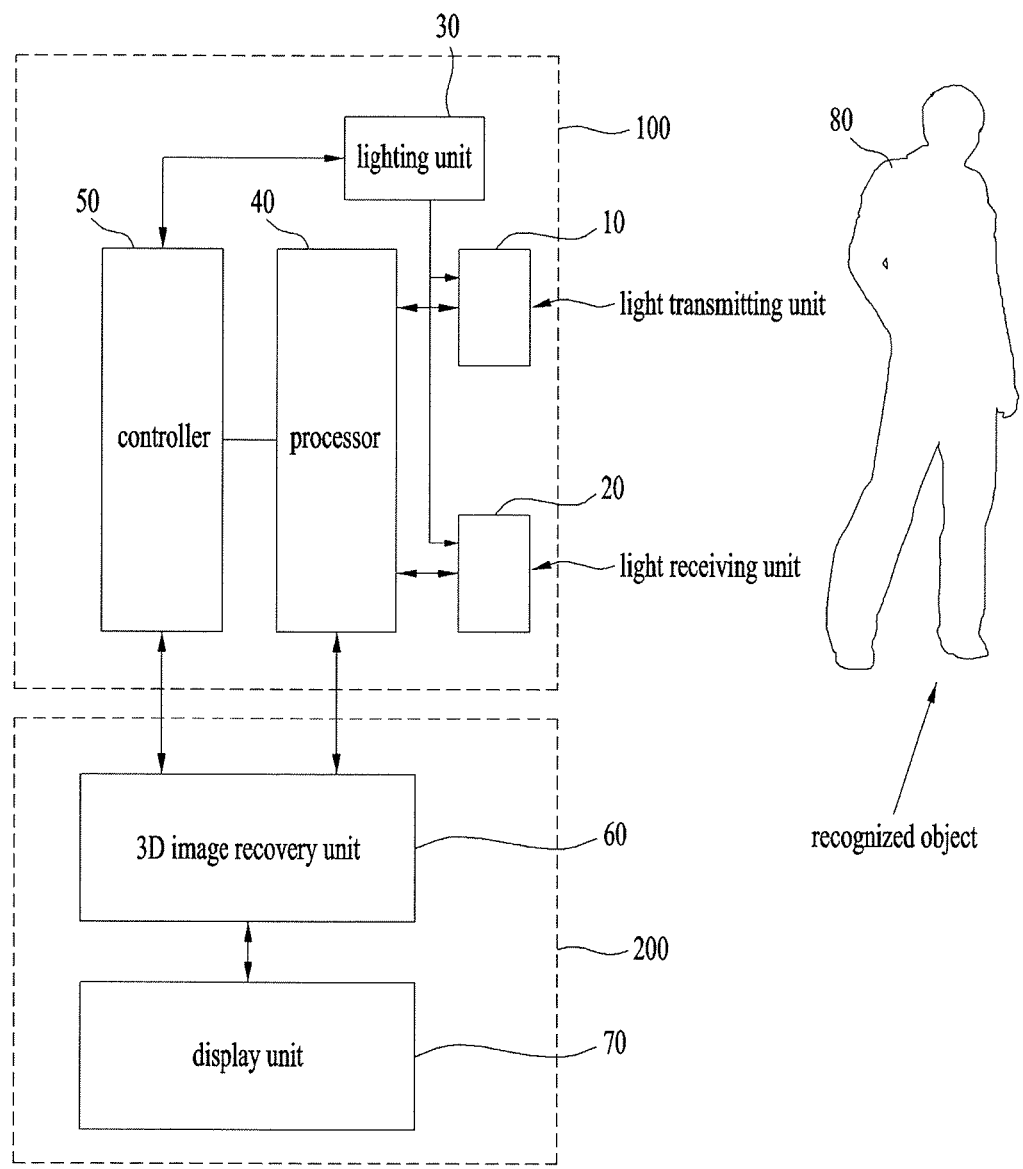
FIG. 1 is a block diagram illustrating an apparatus for obtaining a 3D image in accordance with the embodiment of the present invention.

FIG. 1 is a block diagram illustrating an apparatus for obtaining a 3D image in accordance with the embodiment of the present invention. Referring to FIG. 1, a reference numeral 100 depicts an apparatus for obtaining a 3D image in a narrow sense, and a reference numeral 200 depicts a display apparatus for displaying a 3D image by receiving the 3D image from the apparatus for obtaining a 3D image and recovering the 3D image to an original image. In a broad sense, the apparatus for obtaining a 3D image means the display apparatus 200.

Figure 2:
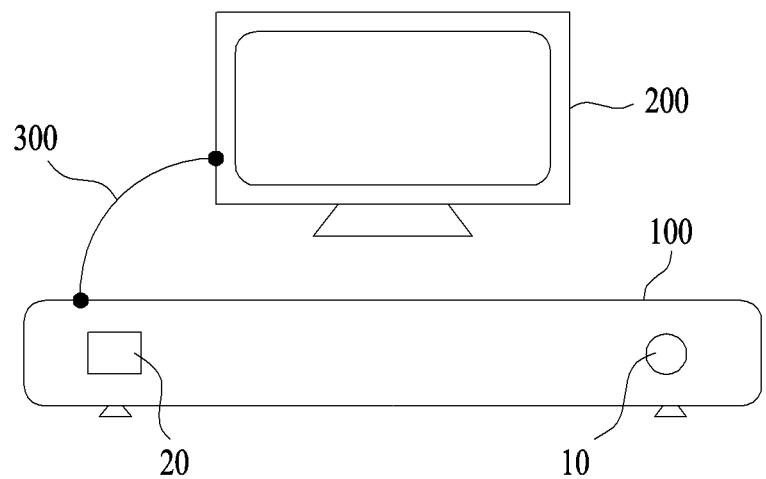
FIG. 2 is an exemplary diagram illustrating that an apparatus 100 for obtaining a 3D image and a display apparatus 200 are separated from each other in accordance with the embodiment of the present invention.

In FIG. 1, the apparatus 100 for obtaining a 3D image in accordance with the embodiment of the present invention may include a light transmitting unit 10, a light receiving unit 20, a processor 40, a lighting unit 30, and a controller 50 for controlling the above units. Also, the display apparatus 200 includes a 3D image recovery unit 60 for receiving 3D image related information (for example, color image information, depth information, etc.) from the apparatus 100 for obtaining a 3D image and recovering the 3D image related information, and a display unit 70 for visually providing the recovered image. Also, the display apparatus 200 may control the 3D image recovery unit 60 and the display unit 70 through the controller 50 within the apparatus 100 for obtaining a 3D image as shown in FIG. 1. On the other hand, although not shown, it will be apparent that a separate controller (not shown) may be provided if the apparatus 100 for obtaining a 3D image and the display apparatus 200 are provided separately from each other as shown in FIG. 2.

In particular, it is intended to describe the embodiment of FIG. 1, for example, with reference to a case where the 3D image is obtained using structured light. However, as described above, some concept of the present invention may be applied to another system (for example, TOF system) for obtaining a 3D image by using infrared rays without being limited to a structured light system only. In this specification, a detailed description of the structured light system, which is already known, and the TOF system will be omitted.

The light transmitting unit 10 emits infrared rays (IR) to a recognized object 80 to obtain 3D depth information of the recognized object 80. For example, for application of the structured light system, the infrared rays may include a specific pattern. In this case, the light transmitting unit 10 may be a structured light unit for emitting infrared structured light.

Also, the light receiving unit 20 includes a sensor for receiving infrared rays and visible light reflected from the recognized object. In the present invention, it is characterized in that the light receiving unit 20 includes an RGB-IR single sensor that may obtain infrared rays and visible light on the same axis and at the same space. In this respect, a pixel arrangement structure of the RGB-IR single sensor constituting the light receiving unit 20 will be described later in detail with reference to FIGS. 4 to 6.

Also, the processor 40 obtains depth information of the recognized object by using the infrared rays received by the light receiving unit 20, and generates color image information by using the visible light received by the light receiving unit 20. The depth information and the color image information, which are obtained by the processor, will be referred to as 3D image information of the recognized object. Also, the 3D image information obtained by the processor 40 is provided to the image recovery unit 60 and used for 3D image recovery. That is, the image recovery unit 60 recovers the 3D image by applying the depth information to the color image information.

Also, the lighting unit 30 is characterized to control an infrared lighting period under the control of the controller 50 to prevent interference of the infrared rays and the visible light within the light transmitting unit 10 from occurring. In particular, the present invention is also characterized in that the lighting unit 30 considers brightness of ambient light in controlling the infrared lighting period. In this regard, a method for controlling a lighting period of the controller 50 and the lighting unit 30 will be described in detail with reference to FIGS. 7 to 11. Also, in FIG. 1, for convenience of description, the lighting unit 30 and the light transmitting unit 10 are separated from each other. However, the description of FIG. 1 is only exemplary. Therefore, in actual application of the product, the lighting unit 30 may include lenses serving as lighting sources in the light transmitting unit 10, and may be provided as a part integrated with the light transmitting unit 10.

In this regard, FIG. 2 is an exemplary diagram illustrating that an apparatus 100 for obtaining a 3D image and a display apparatus 200 are separated from each other in accordance with the embodiment of the present invention. As shown in FIG. 2, if the two apparatuses 100 and 200 are separated from each other, the 3D related information obtained from the processor 40 within the apparatus 100 for obtaining a 3D image may be transferred to the image recovery unit 60 within the display apparatus 200 through a signal connection line 300. Also, the signal connection line 300 may be provided as a wire or wireless line. For example, although the signal connection line 300 may have a physical shape such as a cable line, the signal connection line 300 may be provided as a wireless network (for example, Bluetooth, NFC, WiFi, etc.). If the wireless network is used as the signal connection line 300, it will be apparent that a wireless network module for supporting data transmission and reception through the wireless network may additionally be provided within the device 100 for obtaining a 3D image and the display apparatus 200. In this regard, the light transmitting unit 10 and the light receiving unit 20 may be provided at one side outside the apparatus 100 for obtaining a 3D image, in an identifiable shape.

Figure 3:
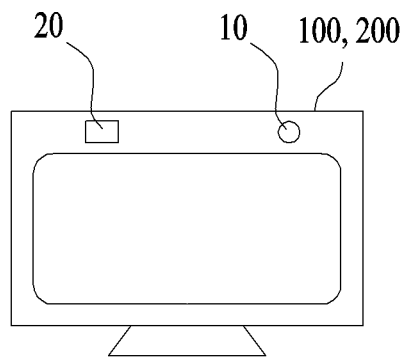
FIG. 3 is an exemplary diagram illustrating that an apparatus 100 for obtaining a 3D image and a display apparatus 200 are integrated with each other in accordance with the embodiment of the present invention.

Also, FIG. 3 is an exemplary diagram illustrating that an apparatus 100 for obtaining a 3D image and a display apparatus 200 are integrated with each other in accordance with the embodiment of the present invention. As shown in FIG. 3, if the two apparatuses 100 and 200 are an integrated single product, the light transmitting unit 10 and the light receiving unit 20 may be provided at one side outside the display apparatus 200 for obtaining a 3D image, in an identifiable shape.

Hereinafter, a pixel arrangement structure of the RGB-IR single sensor constituting the light receiving unit 20 will be described with reference to FIGS. 4 to 6. That is, the RGB-IR single sensor may obtain color images of a visible light area through R (Red), G (Green) and B (Blue) pixels and also obtain infrared images through infrared ray (IR) pixels.

Also, in order to obtain RGB color images and IR images, various interpolation methods are generally applied to components obtained by each pixel. For example, a demosaicing method is widely used as the interpolation method. The demosaicing method is a kind of color filter interpolation method, and means an image processing algorithm for recovering a full color value of all pixels in pixel arrangement. For example, various interpolation methods suitable for a corresponding purpose, such as sum of average weighted values and sum of edge based weighted values, are applied to the demosaicing method. Therefore, each pixel may be recovered to have all components (R, G, B, IR) through the demosaicing method. Particularly, in case of recovery of a structured light image in the IR pixel, different results may be obtained depending on whether a center point of a light point of Gaussian characteristic is located in the IR pixel as a method for separately recovering a light point. That is, since a light point of the IR structured light basically has a Gaussian format, the light point may be recovered through modeling.

Hereinafter, various pixel arrangements constituting the RGB-IR single sensor according to the embodiment of the present invention will be described. First of all, FIG. 4 is an exemplary diagram illustrating a pixel arrangement order of an RGB-IR sensor according to the related art. In more detail, FIG. 4 is an exemplary diagram illustrating that one G pixel is modified into IR pixel in a general RGB sensor (which is widely known as a 'Bayer sensor structure') that includes one R pixel, one B pixel and two G pixels. Therefore, the pixel arrangement order of the RGB-IR sensor of the related art in FIG. 4 is configured in such a manner that a pixel basic unit structure 201 is equally repeated at an equivalent interval.

Figure 6:
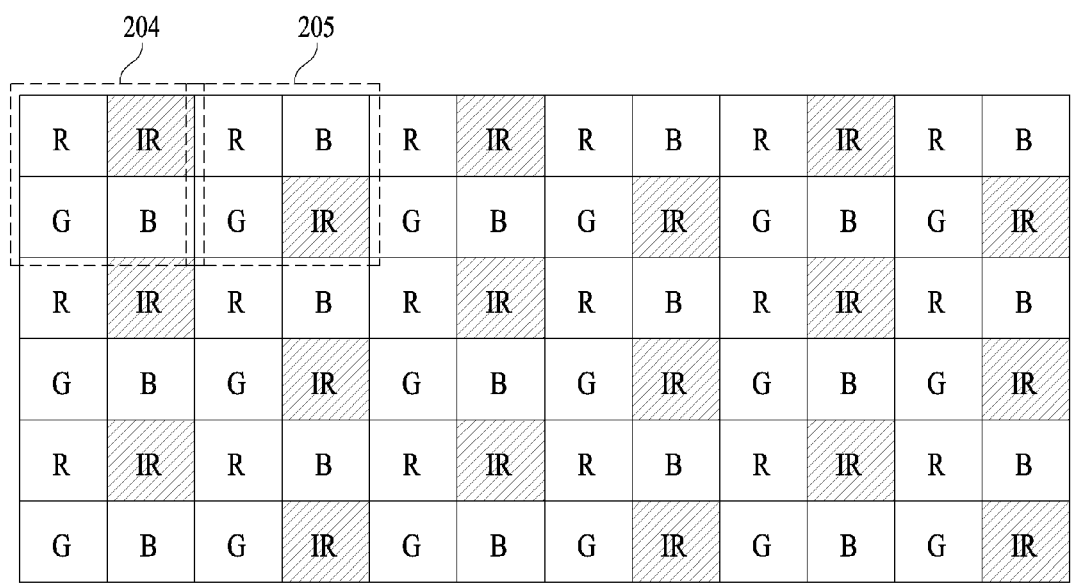
FIG. 6 is another exemplary diagram illustrating a pixel arrangement order of an RGB-IR sensor according to the embodiment of the present invention.

On the other hand, FIGS. 5 and 6 are exemplary diagrams illustrating a pixel arrangement order of an RGB-IR sensor according to the embodiment of the present invention. That is, the RGB-IR sensor has one pixel basic unit structure 201 as shown in FIG. 4, whereas at least two or more pixel basic unit structures 202, 203, 204 and 205 are configured and especially, IR pixels for priority interpolation are not maintained at equivalent intervals in the embodiment of FIGS. 5 and 6.

In more detail, in FIG. 5, as one embodiment of the present invention, the first pixel basic unit structure 202 has a pixel order in the order of R→G→B→IR clockwise from a left top, whereas the second pixel basic unit structure 203 has a pixel order in the order of IR→G→B→R clockwise from a left top. Therefore, FIG. 5 illustrates a structure that the first pixel basic unit structure 202 and the second pixel basic unit structure 203 are repeatedly arranged in a horizontal direction. In this regard, it is noted from the final RGB-IR sensor pixel arrangement of FIG. 5 that spacing of neighboring IR pixels in a specific IR pixel is differently applied. That is, at least one or more neighboring IR pixels which are tight-coupled in location exist in a pixel location where interpolation is to be performed, whereby it is advantageous in that accuracy of interpolation information may be increased.

For example, in the IR pixel structure arranged as shown in FIG. 5, a case where the aforementioned interpolation method is applied to neighboring pixel areas (for example, pixels of reference numerals 221 to 228) between a specific IR pixel 211 and neighboring IR pixels 212 to 217 will be described as follows. That is, for example, if IR signal is intended to be interpolated in the location of the pixel 221, values of neighboring IR pixels are used. In particular, if at least one or more IR pixels which are tight coupled exist within the shortest distance, it is noted that better interpolation efficiency is obtained. According to the aforementioned example, in the location of the pixel 221 for interpolation, the IR pixel 217 which is tight coupled with the pixel 221 exists at a left side, and IR signal received from the IR pixel 217 may be used for interpolation. Likewise, if the IR signals are intended to be respectively interpolated in the location of the other pixels 223, 225 and 227, the IR signals received by neighboring IR pixels 213, 214 and 216 per pixel may be used for interpolation.

Also, in the location of the pixel 222, if the IR signal is intended to be interpolated, IR signals received by two neighboring IR pixels 211 and 212 which are tight coupled with the pixel 222 may be used for interpolation. Likewise, in the location of the other pixel 226, if the IR signal is intended to be interpolated, IR signals received by two neighboring IR pixels 211 and 216 which are tight coupled with the pixel 226 may be used for interpolation.

As a result, according to the RGB-IR sensor arrangement of FIG. 5, during interpolation of IR components for priority recovery, at least one or more neighboring IR pixels which are tight coupled exist, whereby interpolation efficiency may be more increased.

In this regard, according to the RGB-IR sensor arrangement of FIG. 5, pixels may be arranged based on components (for example, IR components) required for priority recovery in accordance with selection of a designer. That is, all the channel components R, G, B and IR have different intervals. For example, it is noted that IR-components and R-components are arranged at different intervals in the pixel arrangement structure of FIG. 5, whereas G-components and B-components are arranged at equivalent intervals as shown in FIG. 4 of the related art.

Also, in FIG. 6, as another embodiment of the present invention, the third pixel basic unit structure 204 has a pixel order in the order of R→IR→B→G clockwise from a left top, whereas the fourth pixel basic unit structure 205 has a pixel order in the order of R→B→IR→G clockwise from a left top. Therefore, FIG. 6 illustrates a structure that the third pixel basic unit structure 204 and the fourth pixel basic unit structure 205 are repeatedly arranged in a horizontal direction. It is noted from the final RGB-IR sensor pixel arrangement of FIG. 6 that spacing of neighboring IR pixels in a specific IR pixel is differently applied. This could lead to the same interpolation efficiency as that of FIG. 5. That is, at least one or more IR pixels which are tight-coupled in location exist at the shortest distance in a pixel location where interpolation to be performed, whereby it is advantageous in that accuracy of interpolation information may be increased.

In this regard, according to the RGB-IR sensor arrangement of FIG. 6, it is noted that IR-components and B-components are arranged at different intervals in the pixel arrangement structure, whereas R-components and G-components are arranged at equivalent intervals as shown in FIG. 4. As a result, it is noted from FIGS. 5 and 6 that various RGB-IR pixel arrangements which are similar to one another and modified may be made depending on what components for priority recovery are.

Hereinafter, a method for controlling lighting to remove interference that may occur in the RGB-IR sensor will be described in detail with reference to FIGS. 7 to 11.

Figure 7:
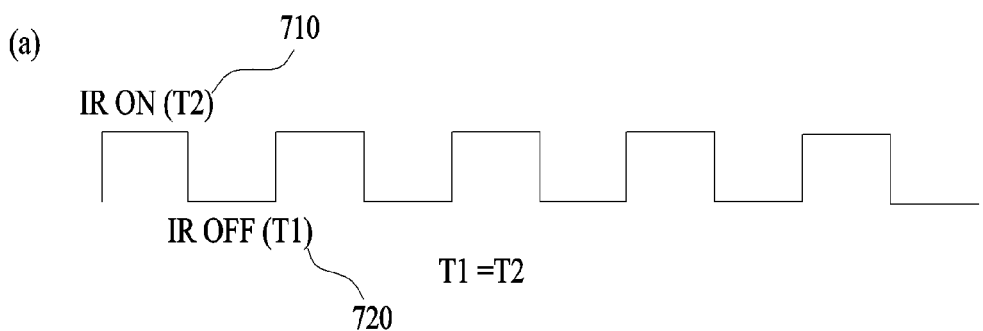
FIG. 7 is a diagram illustrating a method for controlling infrared lighting of an RGB-IR sensor according to the embodiment of the present invention.
Figure 7:
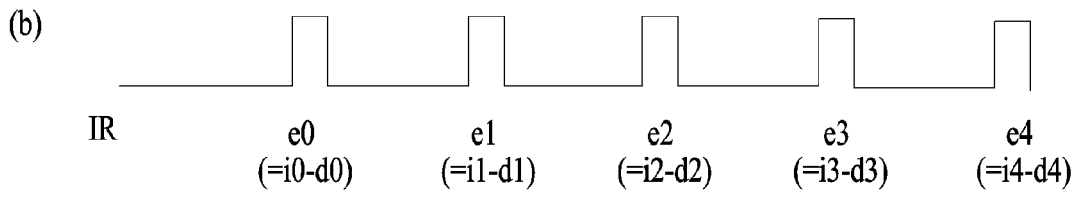

FIG. 7 is a diagram illustrating a method for controlling infrared lighting of an RGB-IR sensor according to the embodiment of the present invention. First of all, FIG. 7(c) illustrates an example of generally obtaining visible light images C0 to C5 and infrared ray images I0 to I5 in accordance with the related art as compared with the embodiment of the present invention. According to FIG. 7(c), in the method for obtaining an image in accordance with the related art, infrared lighting which is activated continuously is used to obtain an infrared image. Therefore, the infrared lighting which is used continuously causes interference that affects the visible light image as described above.

FIG. 7(a) illustrates an example of a method for controlling infrared lighting in accordance with the present invention. Referring to FIG. 7(a), an infrared measurement time period T2 710 and a visible light measurement time period T1 720 are timely separated from each other to control infrared lighting. That is, for the infrared measurement time period T2, infrared images i0, i1, i2, i3 and i4 are obtained using IR pixels of the RGB-IR sensor. On the other hand, for the visible light measurement time period T1, visible light images c0, c1, c2, c3 and c4 are obtained using RGB pixels of the RGB-IR sensor. Therefore, the measurement time periods are timely varied to obtain the infrared images i0 to i4 and the visible light images i0 to i4 in due order, whereby the aforementioned interference may be avoided.

In this regard, although the method for controlling lighting in FIG. 7(a) has been exemplarily described that the infrared measurement time period T2 and the visible light measurement time period T1 correspond to the same time period T1=T2, it will be apparent that various modifications may be made in the measurement time periods. For example, considering brightness of ambient light, the infrared measurement time period T2 and the visible light measurement time period T1 may be applied to their respective time periods different from each other. This will be described later with reference to FIGS. 8 and 9. Also, according to the method for controlling lighting in FIG. 7(a), it is incidentally advantageous in that an issue (which may be referred to as 'Eye-safety issue') related to deterioration in eyesight of a user, which is caused by continuous activation of infrared lighting according to the related art, may be solved as infrared lighting is activated for the given infrared measurement time period T2 only.

FIG. 7(b) illustrates a method for obtaining an infrared image of high accuracy by using a difference between infrared images obtained in the method for controlling lighting as shown in FIG. 7(a). That is, FIG. 7(b) illustrates a method for obtaining infrared differential images e0, e1, e2, e3 and e4 from infrared images i0, i1, i2, i3 and i4 obtained in a state that infrared lighting is activated for the infrared measurement time period T2 and infrared images d0, d1, d2, d3 and d4 obtained in a state that infrared lighting is deactivated for the visible light measurement time period T1.

In this regard, the infrared images d0 to d4 obtained in a state that infrared lighting is deactivated for the visible light measurement time period T1 mean images obtained from infrared values obtained through IR pixels of the RGB-IR sensor despite that infrared lighting has been deactivated. Therefore, the infrared images d0 to d4 may be understood as noise values existing at the corresponding time regardless of activation of infrared lighting. Therefore, it is highly probable that the noise values may be included even in the infrared images i0 to i4 obtained in a state that infrared lighting is activated for the infrared measurement time period T2 close to the visible light measurement time period T1. Therefore, use of the infrared differential images e0 to e4 from which noise is removed becomes the method for obtaining an infrared image of higher purity.

For example, the first infrared differential image e0 is obtained by subtracting the first noise infrared image d0 from the first infrared image i0. This procedure is repeated, whereby the other infrared images e1 to 34 may be obtained equally. That is, the infrared differential images e0 to e4 may be obtained in due order by the equations of (e0=i0−d0), (e1=i1−d1), (e2=i2−d2), (e3=i3−d3) and (e4=i4−d4).

In this regard, whether any one of the aforementioned infrared images i0 to i4 or infrared differential images e0 to e4 will be used as information for measuring 3D depth of the recognized object 80 may be determined freely by selection of the system designer. For example, the infrared images i0 to i4 obtained for the time period T1 may be used if simplification of the system is desired, whereas the infrared differential images e0 to e4 may be used if the system is complicated but higher accuracy is desired.

Figure 8:
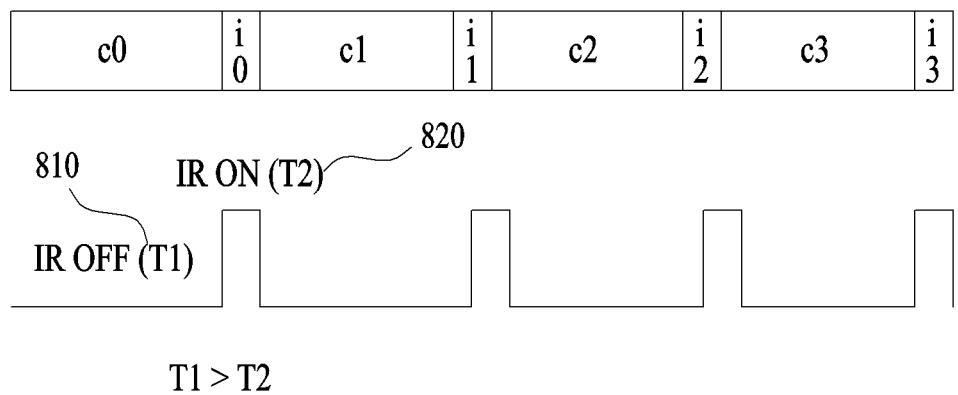
FIG. 8 is a diagram illustrating that brightness of ambient light is dark in a method for controlling infrared lighting of an RGB-IR sensor according to the embodiment of the present invention.
Figure 9:
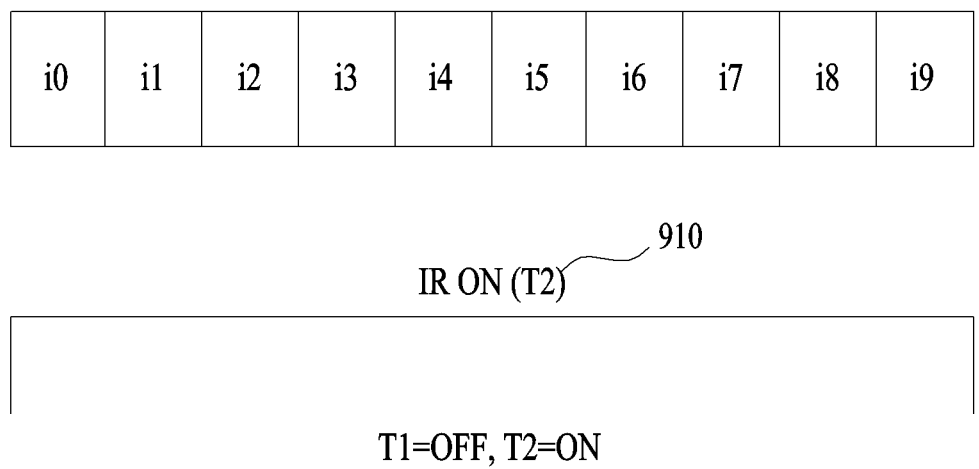
FIG. 9 is a diagram illustrating that ambient light little exists in a method for controlling infrared lighting of an RGB-IR sensor according to the embodiment of the present invention.

FIGS. 8 and 9 are diagrams illustrating a method for controlling lighting time by considering brightness of ambient light in a method for controlling infrared lighting of an RGB-IR sensor according to the embodiment of the present invention. In this regard, FIG. 8 is a diagram illustrating that brightness of ambient light is dark in a method for controlling infrared lighting of an RGB-IR sensor, and FIG. 9 is a diagram illustrating that ambient light little exists in a method for controlling infrared lighting of an RGB-IR sensor. In this regard, if ambient light is sufficiently bright, the method for controlling lighting in FIG. 7 may be used.

Figure 11:
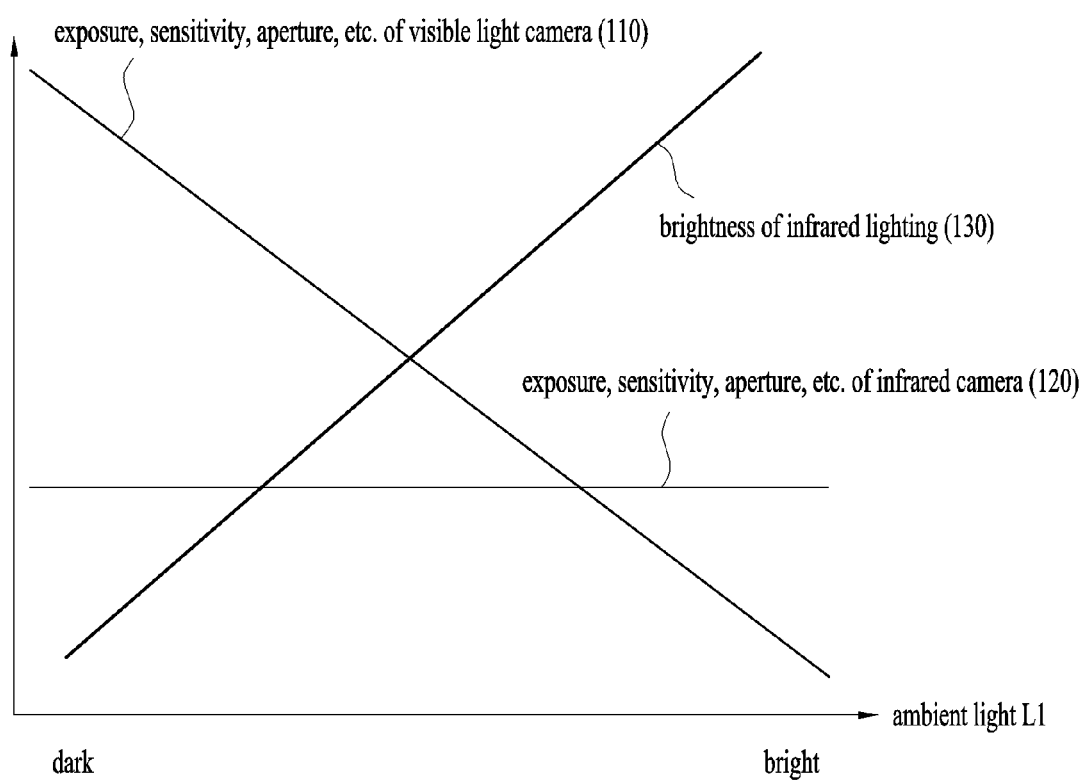
FIG. 11 is a graph illustrating a relation between brightness of ambient light and a condition of a visible light camera and an infrared camera.

First of all, image-taking conditions of a visible light camera and an infrared camera based on brightness of ambient light and their related problems will be described with reference to FIG. 11. In order to solve the aforementioned interference, a visible light-taking time period (which may correspond to the aforementioned 'visible light measurement time period T2', for example) and an infrared image-taking time period (which may correspond to the aforementioned 'infrared measurement time period T1', for example) may be subjected to time-division and synchronized with lighting, whereby interference may be removed. However, when synchronization is performed, features of a camera required for visible light image-taking and infrared image-taking are varied. For example, as shown in FIG. 11, in case of visible light measurement, short exposure, a narrow aperture caliber, and low sensitivity are favorable if ambient light is bright, whereas a long exposure time, a wide aperture caliber, and high sensitivity are required if ambient light becomes dark (graph 110). On the other hand, in case of infrared measurement, setup of the camera is little affected by ambient light (graph 130). However, in case of infrared measurement, when the ambient light is bright, brighter lighting is required to identify infrared noise generated near the ambient light from the ambient light, and when the ambient becomes dark, dark lighting may be used (graph 130). Inefficient aspects may occur due to the above features when the visible light and the infrared rays are taken using one camera setup value. The main problem is an image-taking time and a noise level of image. For example, if measurement is performed using setup for visible light measurement, a long exposure time is required in case of a low light level (the case where the ambient light is dark), whereby a total image-taking time becomes slow. Also, since high sensitivity is required, the noise level is increased.

Considering brightness of the ambient light as above, FIG. 8 illustrates a method for controlling infrared lighting of the RGB-IR sensor when brightness of the ambient light is dark while FIG. 9 illustrates a method for controlling infrared lighting of the RGB-IR sensor when the ambient light little exists.

For example, when brightness of the ambient light is dark like night and dark space, it is preferable that a visible light measurement time period T1 810 and an infrared measurement time period T2 820 are set in such a manner that the visible light measurement time period T1 810 is longer than the infrared measurement time period T2 820 (T1>T2). Therefore, the visible light images c0, c1, c2 and c3 obtained for the visible light measurement time period T1 may obtain higher picture quality than that of a conventional case by a longer exposure time. Also, when brightness of the ambient light is dark, it is preferable to control infrared lighting generated for the infrared measurement time period T2 so as to maintain a lower output power than that of the conventional case.

Also, when the ambient light little exists or visible light image-taking is required as a special case, it is preferable that the visible light measurement time period T1 is maintained as off-state, whereas the infrared measurement time period T2 is maintained as on-state (T1=OFF, T2=ON). Therefore, the infrared lighting generated for the infrared measurement time period T2 may be controlled to maintain a lower output power than that of the conventional case, and the infrared lighting of the low output power may be activated continuously, whereby infrared image-taking may be performed at high speed.

Figure 10:
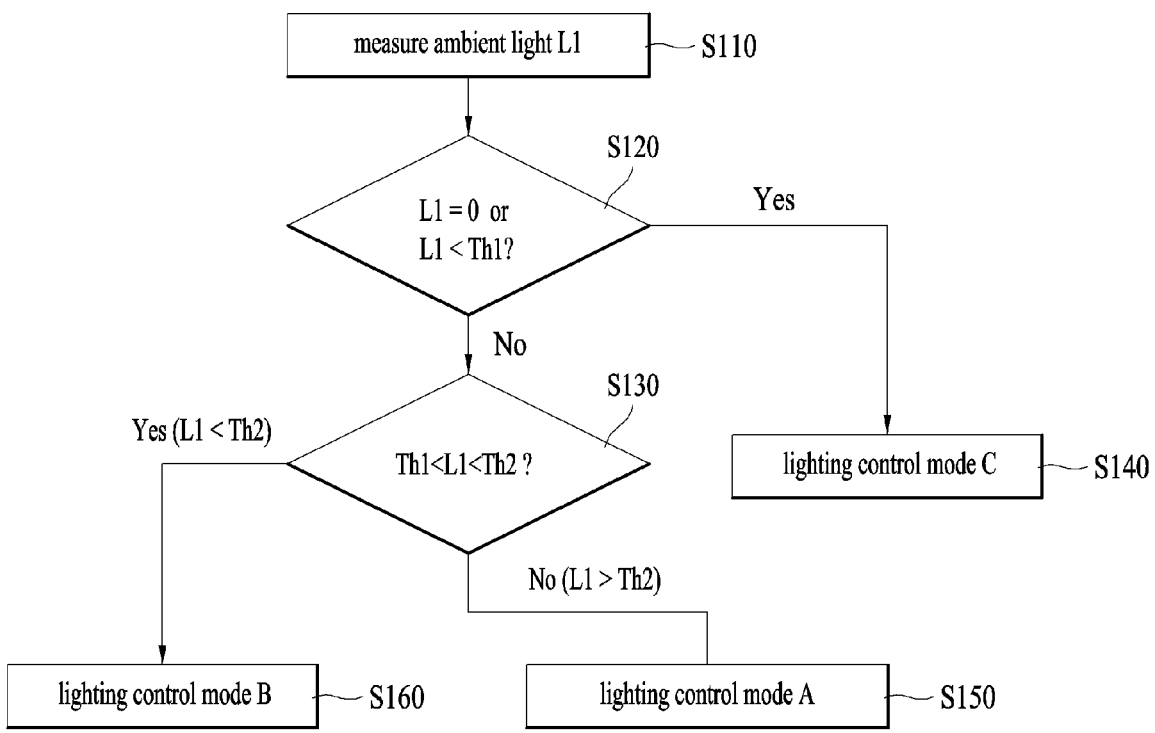
FIG. 10 is a flow chart illustrating that a method for controlling infrared lighting of an RGB-IR sensor according to the embodiment of the present invention.

FIG. 10 is a flow chart illustrating that a method for controlling infrared lighting of an RGB-IR sensor according to the embodiment of the present invention. The flow chart shown in FIG. 10 illustrates a control method for selecting any one of the aforementioned methods for controlling lighting in FIGS. 7 to 9 in accordance with brightness of ambient light.

First of all, brightness of ambient light L1 is measured (S110). Brightness of the ambient light may be identified by a separate illuminance sensor (not shown) provided at one side of the apparatus 100 for obtaining a 3D image or the display apparatus 200. Alternatively, previous image-taking statistical data may be used. In addition, brightness of the ambient light may be measured by various methods such as considering a current time compared with a daily sunrise/sunset time.

The measured brightness of the ambient light L1 is zero (0) or is compared with a predetermined minimum reference value Th1 (S120). As a result of comparison of the step S120, if the ambient light L1 is less than the minimum reference value Th1 (that is, L1<Th1), a lighting control mode C, which is the same as or similar to that of FIG. 9, is used (S140). That is, according to the lighting control mode of the step S140, the visible light measurement time period T1 is maintained at off-state, whereas the infrared measurement time period T2 910 is continuously maintained at on-state, whereby infrared lighting of low output power may be activated continuously to perform infrared image-taking at high speed.

Also, as a result of comparison of the step S120, if the ambient light L1 is higher than the minimum reference value Th1 (that is, L1>Th1), the ambient light L1 is compared with a predetermined conventional reference value Th2 (S130). As a result of comparison of the step S130, if the ambient light L2 is less than the conventional reference value Th2 (that is, Th1<L1<Th2), a lighting control mode B, which is the same as or similar to that of FIG. 9, is used (S160). That is, according to the lighting control mode of the step S160, the visible light measurement time period T1 and the infrared measurement time period T2 are set in such a manner that the visible light measurement time period T1 is longer than the infrared measurement time period T2 (T1>T2). Therefore, visible light images obtained for the visible light measurement time period T1 may obtain higher picture quality than that of the conventional case by a longer exposure time. Also, when brightness of the ambient light is dark, it is preferable to control infrared lighting generated for the infrared measurement time period T2 so as to maintain a lower output power than that of the conventional case.

Also, as a result of comparison of the step S130, if the ambient light L1 is higher than the convention reference value Th2 (that is, L1>Th2), a lighting control mode A, which is the same as or similar to that of FIG. 7, is used (S150). That is, according to the lighting control mode of the step S150, the visible light measurement time period T1 and the infrared measurement time period T2 are set in such a manner that the visible light measurement time period T1 is the same as the infrared measurement time period T2 (T1=T2). Also, when the ambient light is bright, camera setup values such as exposure time, sensitivity, and aperture size, which are the same as or similar to one another, are used for visible light/infrared image-taking. However, infrared lighting is controlled at a high output power and infrared differential images (for example, e0 to e4 in FIG. 7) of high efficiency are obtained from the relation between infrared measurement images (for example, d0 to d4 in FIG. 7) when lighting is deactivated and infrared measurement images (for example, i0 to i4 in FIG. 7) when lighting is activated, whereby the obtained infrared differential images may be used for 3D measurement calculation.

That is, according to the embodiment of the present invention, it is noted that the system may automatically vary the lighting control mode adaptively in accordance with brightness of the ambient light. Also, it will be apparent that the lighting control mode may be determined by manual manipulation of the user. Therefore, 3D images may be obtained stably even under any ambient light condition.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

As described above, the present invention may be applied to various fields that require 3D image acquisition. For example, the present invention may be applied to a 3D game player that recognizes an action signal through gesture recognition of a user or various remote controllers based on a user gesture.

The invention claimed is:

1. An apparatus for obtaining a 3D image, the apparatus comprising:
   a light transmitter configured to transmit infrared ray (IR) structured light to a recognized object;
   an RGB-IR sensor configured to receive infrared rays and visible light reflected from the recognized object;
   a processor configured to obtain 3D image information including depth information and a visible light image of the recognized object by using each of the infrared rays and the visible light, which are received by the RGB-IR sensor; and
   a lighting controller configured to:
   control a lighting cycle of the IR structured light to remove interference between a visible light measurement time period T1 and an infrared measurement time period T2 by separating the visible light measurement time period T1 and the infrared measurement time period T2 from each other, and
   repeat the visible light measurement time period T1 and the infrared measurement time period T2 at a same period by considering a brightness of ambient light when the brightness of the ambient light is more than a predetermined conventional reference value Th2,
   wherein the processor is further configured to obtain infrared differential images by subtracting infrared images obtained for the visible light measurement time period T1 from infrared images obtained for the infrared measurement time period T2.

2. The apparatus according to claim 1, wherein the processor measures a depth of the recognized object by using the obtained infrared differential images.

3. The apparatus according to claim 1, wherein the lighting controller controls the lighting cycle of the IR structured light to allow the visible light measurement time period T1 to be longer than the infrared measurement time period T2 if the brightness of the ambient light is less than the predetermined conventional reference value Th2.

4. The apparatus according to claim 1, wherein the lighting controller controls the lighting cycle of the IR structured light to allow the infrared measurement time period T2 only without the visible light measurement time period T1 if the brightness of the ambient light is less than a predetermined minimum reference value Th1.

5. The apparatus according to claim 1, wherein the RGB-IR sensor has an arrangement of R, G, B and IR pixels with the IR pixels not arranged at equivalent intervals.

6. The apparatus according to claim 1, further comprising:
   an image recovery processor configured to recover the 3D image of the recognized object by using the 3D image information obtained by the processor; and
   a display configured to display the recovered 3D image on a screen.

7. A method for obtaining a 3D image, the method comprising:
   emitting infrared ray (IR) structured light to a recognized object and receiving infrared rays and visible light reflected from the recognized object;
   obtaining, via a processor, 3D image information including depth information and a visible light image of the recognized object by using each of the infrared rays and the visible light, which are received;
   controlling a lighting cycle of the IR structured light to repeat a visible light measurement time period T1 and an infrared measurement time period T2 at a same period if a brightness of the ambient light is more than a predetermined conventional reference value Th2; and
   obtaining, via the processor, infrared differential images by subtracting infrared images obtained for the visible light measurement time period T1 from infrared images obtained for the infrared measurement time period T2,
   wherein the lighting cycle of the IR structured light is controlled to remove interference between the visible light measurement time period T1 and the infrared measurement time period T2 by separating the visible light measurement time period T1 and the infrared measurement time period T2 from each other when the IR structured light is emitted to the recognized object.

8. The method according to claim 7, wherein the lighting cycle of the IR structured light is controlled to allow the infrared measurement time period T2 only without the visible light measurement time period T1 if the brightness of the ambient light is less than a predetermined minimum reference value Th1.

9. The method according to claim 7, wherein the lighting cycle of the IR structured light is controlled to allow the visible light measurement time period T1 to be longer than the infrared measurement time period T2 if the brightness of the ambient light is between a minimum reference value Th1 the predetermined conventional reference value Th2.

10. The method according to claim 7, wherein a depth of the recognized object is measured by using the obtained infrared differential images.

11. A method for obtaining a 3D image by emitting infrared ray (IR) structured light to a recognized object and obtaining 3D image information of the recognized object by using infrared rays and visible light reflected from the recognized object, the method comprising:
    measuring ambient light;
    comparing the measured ambient light with a predetermined reference value;
    controlling a lighting cycle of the IR structured light to remove interference between a visible light measurement time period T1 and an infrared measurement time period T2 by separating the visible light measurement time period T1 and the infrared measurement time period T2 from each other;
    controlling the lighting cycle of the IR structured light to repeat the visible light measurement time period T1 and the infrared measurement time period T2 at a same period if a brightness of the ambient light is more than a predetermined conventional reference value Th2; and
    obtaining infrared differential images by subtracting infrared images obtained for the visible light measurement time period T1 from infrared images obtained for the infrared measurement time period T2 and measuring a depth of the recognized object by using an obtained infrared differential images.

12. The method according to claim 11, wherein the lighting cycle of the IR structured light is controlled to allow the infrared measurement time period T2 only without the visible light measurement time period T1 if the brightness of the ambient light is less than a minimum reference value Th1.

13. The method according to claim 11, wherein the lighting cycle of the IR structured light is controlled to allow the visible light measurement time period T1 to be longer than the infrared measurement time period T2 if the brightness of the ambient light is between the minimum reference value Th1 and the predetermined conventional reference value Th2.

* * * * *